United States Patent
Tsuruta (10) Patent No.: US 10,124,771 B2
(45) Date of Patent: Nov. 13, 2018

(54) WIPER SYSTEM

(71) Applicant: Takao Tsuruta, Osaka (JP)

(72) Inventor: Takao Tsuruta, Osaka (JP)

( * ) Notice: Subject to any disclaimer, the term of this patent is extended or adjusted under 35 U.S.C. 154(b) by 0 days.

(21) Appl. No.: 15/560,483

(22) PCT Filed: Jan. 29, 2016

(86) PCT No.: PCT/JP2016/052741
§ 371 (c)(1),
(2) Date: Sep. 21, 2017

(87) PCT Pub. No.: WO2017/130392
PCT Pub. Date: Aug. 3, 2017

(65) Prior Publication Data
US 2018/0056945 A1    Mar. 1, 2018

(51) Int. Cl.
B60S 1/20 (2006.01)
B60S 1/44 (2006.01)
B60S 1/34 (2006.01)
B60S 1/04 (2006.01)

(52) U.S. Cl.
CPC .............. B60S 1/3404 (2013.01); B60S 1/20 (2013.01); B60S 1/347 (2013.01); B60S 1/3488 (2013.01); B60S 1/44 (2013.01); *B60S 1/0455* (2013.01); *B60S 1/0491* (2013.01)

(58) Field of Classification Search
CPC .... B60S 1/3404; B60S 1/0455; B60S 1/0452; B60S 1/44; B60S 1/20; B60S 1/28; B60S 1/345; B60S 1/347; B60S 1/3488
USPC .......................... 15/250.24, 250.19, 250.29
See application file for complete search history.

(56) References Cited

U.S. PATENT DOCUMENTS

| | | | | |
|---|---|---|---|---|
| 828,245 A * | 8/1906 | Reimers | ................ | B60S 1/3404 |
| | | | | 15/250.29 |
| 2,131,341 A * | 9/1938 | Waters | ....................... | B60S 1/12 |
| | | | | 15/250.19 |
| 4,945,601 A * | 8/1990 | Bilodeau | ................ | B60S 1/0452 |
| | | | | 15/250.19 |

FOREIGN PATENT DOCUMENTS

| | | |
|---|---|---|
| DE | 2753003 A1 | 6/1978 |
| FR | 2334542 A1 | 7/1977 |
| GB | 1552733 A | 9/1979 |
| JP | 56-97162 U | 8/1981 |
| JP | 64-22663 U | 2/1989 |
| JP | 6-42477 U | 6/1994 |
| JP | 2003-341482 A | 12/2003 |

OTHER PUBLICATIONS

International Search Report in International Patent Application No. PCT/JP2016/052741, dated Mar. 8, 2016.

* cited by examiner

*Primary Examiner* — Gary Graham
(74) *Attorney, Agent, or Firm* — Hauptman Ham, LLP (57) ABSTRACT

A wiper system for wiping off deposits deposited on a surface of a wiped member comprising a pair of carriages attached to frame members holding the wiped member so as to face each other across the wiped member and moving back and forth over the frame members along two facing sides of the wiped member, a pair of wiper arms respectively attached to the pair of carriages and extending from the frame member sides to the wiped member sides, and a pair of wiper blades respectively attached to the pair of wiper arms, extending substantially parallel to the other two facing sides of the wiped member, and arranged at the surface of the wiped member.

5 Claims, 10 Drawing Sheets

WIPER SYSTEM

RELATED APPLICATIONS

The present application is a National Phase of International Application No. PCT/JP2016/052741, filed Jan. 29, 2016.

TECHNICAL FIELD

The present disclosure relates to a wiper system.

BACKGROUND ART

PLT 1 discloses as a conventional wiper system for wiping off deposits deposited on a surface of a window wherein wiper arms to which wiper blades are attached are made to move back and forth (in fan-like motions) about shafts in predetermined angular ranges to wipe off the deposits deposited on the surface of the window in fan-like manners.

CITATION LIST

Patent Literature

PLT 1: Japanese Patent Publication No. 2009-269525A

SUMMARY OF INVENTION

Technical Problem

However, in the above-mentioned conventional wiper system, there was the problem that it was only possible to wipe away deposits deposited on the surface of the window in fan-like manners so the parts wiped by the wiper system were small.

The present disclosure was made in consideration of such a problem and has as its object the provision of a wiper system able to wipe the entire surface of a window or other wiped member.

Solution to Problem

To solve this problem, according to one aspect of the present disclosure, there is provided a wiper system for wiping off deposits deposited on a surface of a wiped member, comprising a pair of carriages attached to frame members holding the wiped member so as to face each other across the wiped member and moving back and forth over the frame members along two facing sides of the wiped member, a pair of wiper arms respectively attached to the pair of carriages and extending from the frame member sides to the wiped member sides, and a pair of wiper blades respectively attached to the pair of wiper arms, extending substantially parallel to the other two facing sides of the wiped member, and arranged at the surface of the wiped member.

Advantageous Effects of Invention

According to the wiper system according to this aspect of the present disclosure, it is possible to have two wiper blades wipe the entire surface of a wiped member.

DESCRIPTION OF EMBODIMENTS

Below, embodiments of the present invention will be explained in detail referring to the drawings. Note that, in the following explanation, similar components are assigned the same reference notations.

First Embodiment

First, referring to FIG. 1 to FIG. 6, an example of attaching a wiper system according to a first embodiment of the present invention to a front window arranged at the front of a passenger compartment of a vehicle as a moving object will be explained.

Figure 1:
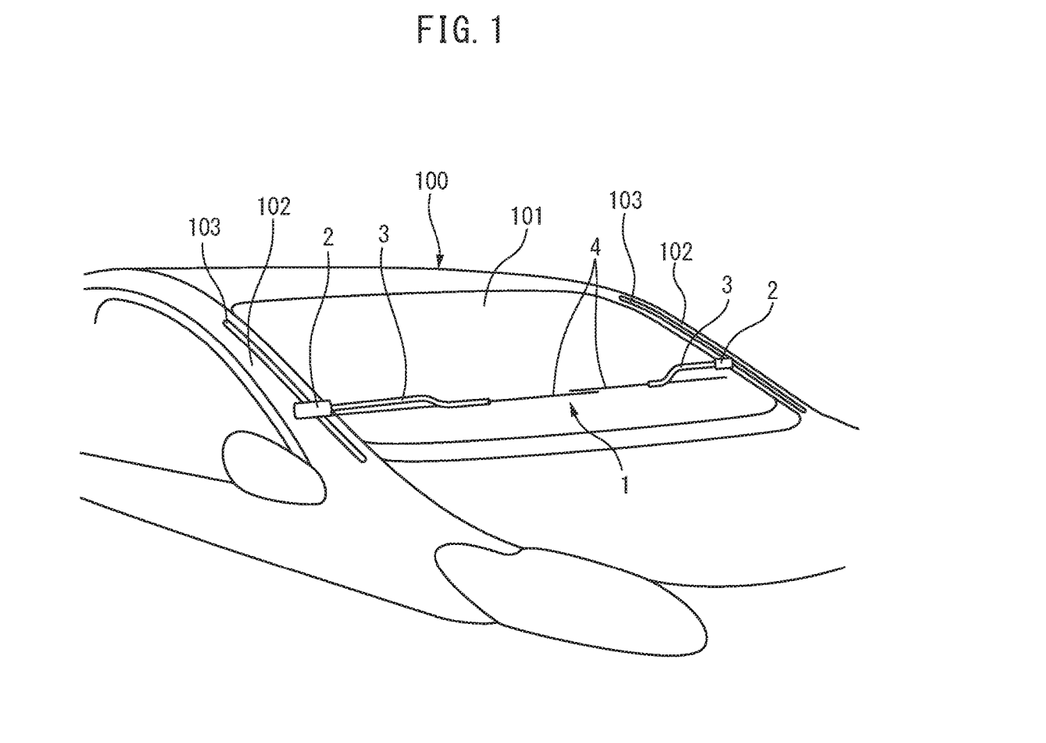
FIG. 1 is a schematic perspective view of a vehicle provided with a wiper system according to a first embodiment of the present invention.

FIG. 1 is a schematic perspective view of a vehicle 100 provided with a wiper system 1 according to the present embodiment.

The wiper system 1 is, for example, a system for wiping away rain drops, snow, ashes, mud, and other deposits deposited on the surface of a window, wall, or other wiped member and provided with carriages 2, wiper arms 3, and wiper blades 4.

The carriages 2 are attached to left and right front pillars 102 holding a front window 101 so as to face each other across the front window 101. The left and right front pillars 102 are provided with guide slits 103 extending up and down along the two left and right sides of the front window 101. Note that the carriages 2 are preferably shaped rounded so that even if a person touches them during operation, he or she will not be injured. Further, the guide slits 103 are preferably shaped so that fingers etc. cannot easily be caught in them.

At the insides of the left and right front pillars 102, as explained later referring to FIG. 6, drive devices 5 for driving the carriages 2 are respectively provided. The carriages 2 are driven by the drive devices 5 and move back and forth over the left and right front pillars 102 along the guide slits 103.

The wiper arms 3 are respectively provided at single end sides at the carriages 2 so as to extend from the front pillar 102 sides toward the front window 101 sides.

The wiper blades 4 are attached to the other end sides of the wiper arms 3 and supported by the wiper arms 3 and are arranged at the surface of the front window 101 so as to become substantially parallel to the two facing top and bottom sides of the front window 101.

Figure 2:
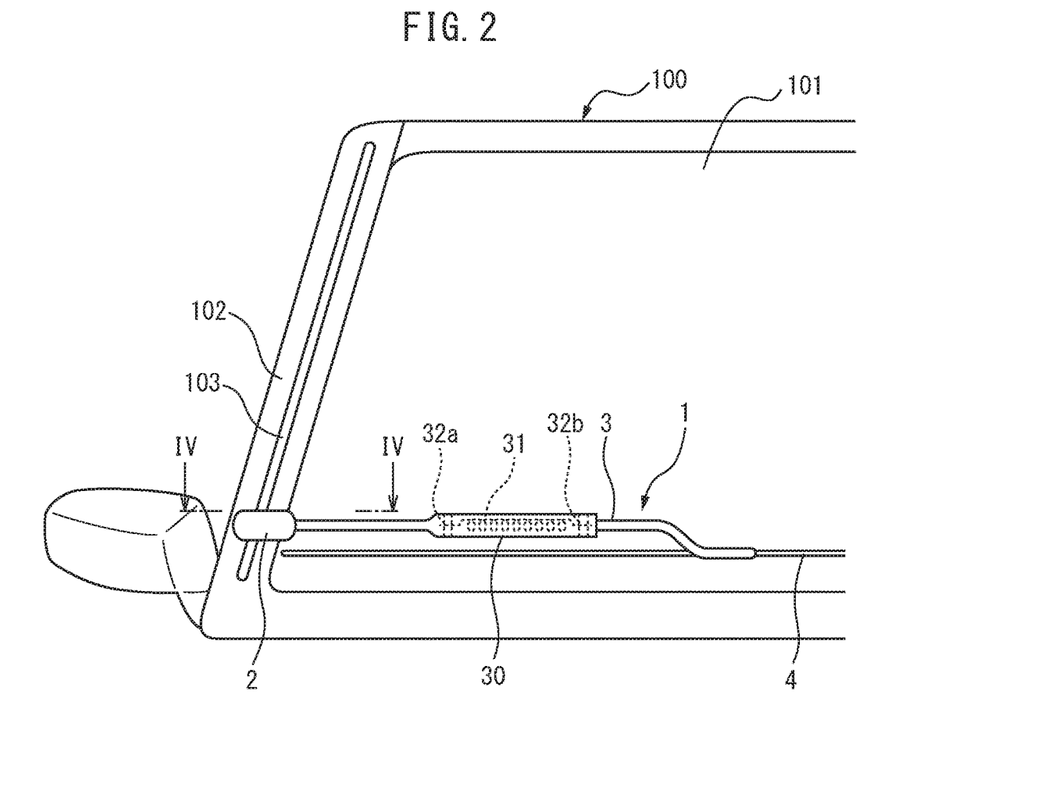
FIG. 2 is a schematic front view showing the area around a front window at a driver's seat side of the vehicle provided with the wiper system according to the first embodiment of the present invention.
Figure 3:
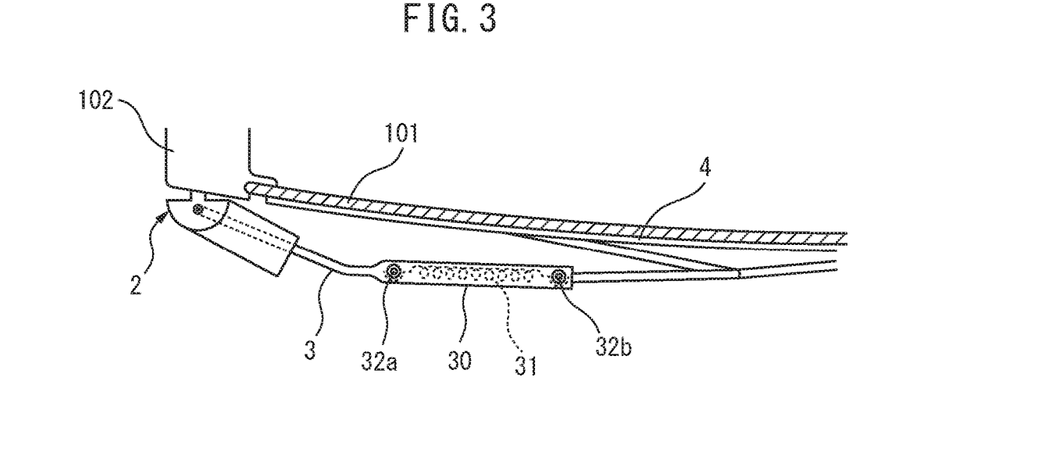
FIG. 3 is a schematic plan view of the wiper system according to the first embodiment of the present invention.

FIG. 2 is a schematic front view showing the area around the front window 101 at a driver's seat side of the vehicle 100 provided with the wiper system 1 according to the present embodiment. FIG. 3 is a schematic plan view of the wiper system 1 according to the present embodiment.

As shown in FIG. 2 and FIG. 3, at the arm center part 30 positioned at the center part of the long direction of each wiper arm 3, a spring 31 is built in for applying force to the wiper arm 3 so as to bias the other end side of the wiper arm 3 (side attaching wiper blade 4) toward the front window 101 side. The spring 31 is fastened, in a state lengthened from its free length, at its two end parts to a pair of engagement shafts 32a, 32b extending in a short direction of the wiper arm 3 and constantly generates an elastic force in the contracting direction. Due to this elastic force, the wiper arm 3 bends and the other end side is made to constantly face the front window 101 side. The wiper blade 4 attached to the other end side of the wiper arm 3 contacts the surface of the front window 101.

Next, referring to FIG. 4 to FIG. 6, the detailed configuration of a carriage 2 and a drive device 5 for driving the carriage 2 will be explained.

Figure 4:
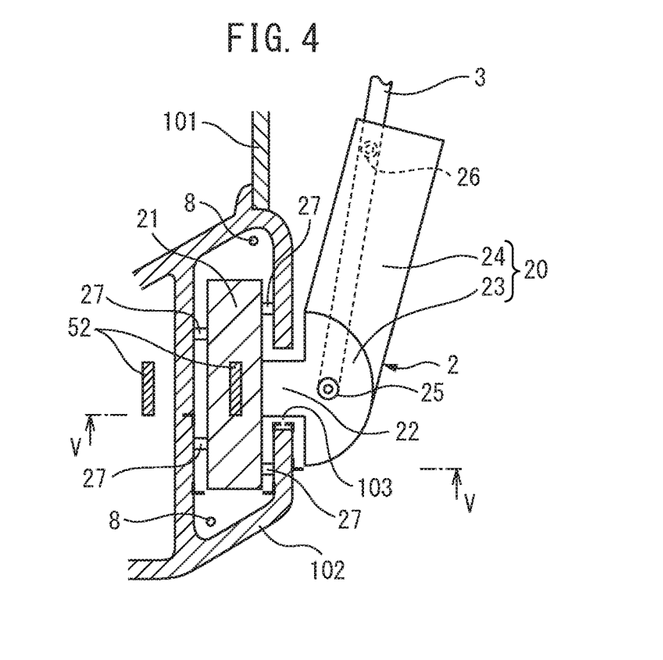
FIG. 4 is a horizontal cross-sectional view around a front pillar along the line IV-IV of FIG. 2.

FIG. 4 is a horizontal cross-sectional view around a front pillar 102 along the line IV-IV of FIG. 2. FIG. 5 is a vertical cross-sectional view around the front pillar 102 along the line V-V of FIG. 4. FIG. 6 is a schematic overall view of a drive device 5.

Figure 5:
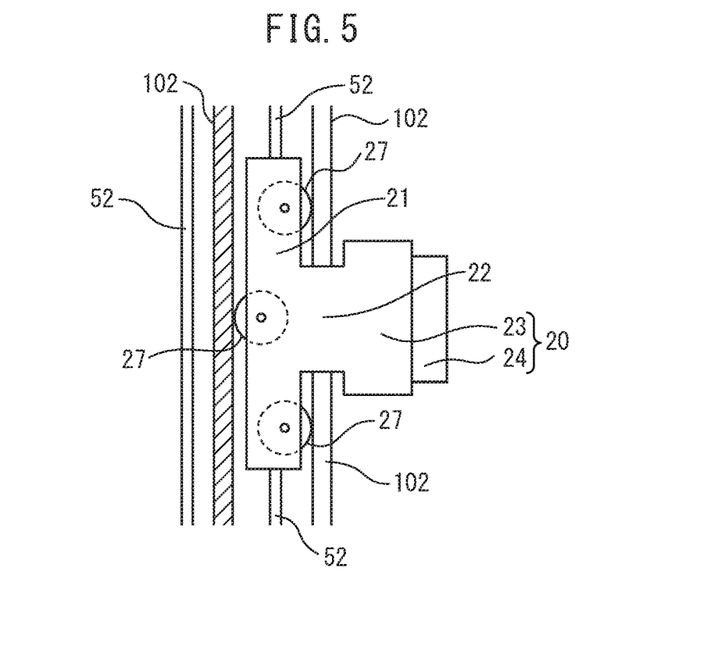
FIG. 5 is a vertical cross-sectional view around the front pillar along the line V-V of FIG. 4.

As shown in FIG. 4 and FIG. 5, a carriage 2 is provided with an outside member 20 arranged at an outside of the front pillar 102, an inside member 21 arranged at an inside of the front pillar 102, and a connecting member 22 arranged at an inside of the guide slit 103 and connecting the outside member 20 and the inside member 21.

The outside member 20 is provided with a semicolumnar part 23 connected to the inside member 21 through the connecting member 22 and a box-shaped part 24 extending from the semicolumnar part 23 to the front window 101 side. The wiper arm 3 is fastened at one end part to the semicolumnar part 23 by a first fastening shaft 25. Further, the wiper arm 3 is arranged with one end side inside the box-shaped part 24 and is fastened inside the box-shaped part 24 by a second fastening shaft 26.

The inside member 21 is attached to a chain 52 running through the center part. At the inside member 21, three sets of pairs of left and right wheels 27 are attached aligned in the vertical direction. The wheels 27 are designed to be able to freely rotate with respect to the inside member 21 in a state contacting the inner circumferential surface of the front pillar 102.

Further, in the present embodiment, the two left and right corners of the inside of the front pillar 102 are provided with heaters 8. In the present embodiment, the heaters 8 prevent freezing of water entering from, for example, the guide slit 103 to the inside of the front pillar 102 and further, when having frozen, cause it to melt to thereby prevent the operation of the carriage 2 from being obstructed. Further, while not shown, the front pillar 102 is provided at suitable locations with discharge holes for discharging water entering the inside of the front pillar 102 or water formed due to melting of ice by the heaters 8 to the outside of the front pillar 102.

Figure 6:
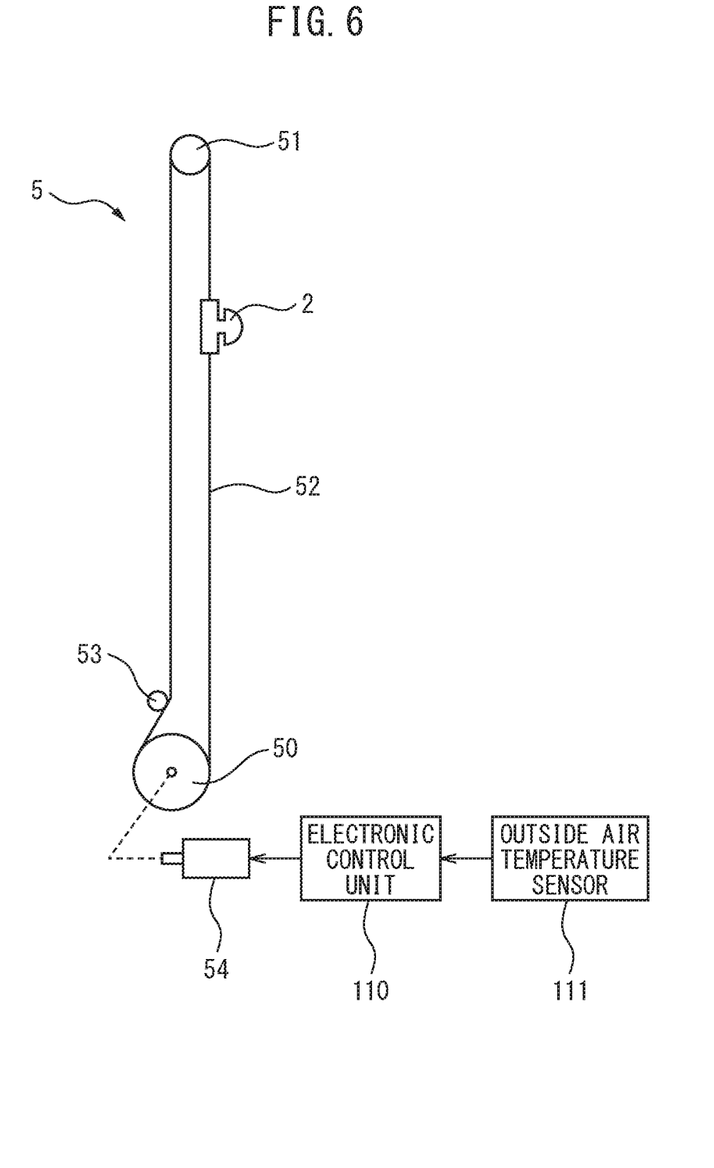
FIG. 6 is a schematic overall view of a drive device.

As shown in FIG. 6, the drive device 5 is provided with two gears 50, 51, a chain 52 wound around the two gears 50, 51, a tensioner 53 for giving tension to the chain 52 to prevent slackening of the chain 52, and a drive motor 54.

Among the two gears, one gear (below, referred to as the "drive gear") 50 is designed to be able to be made to rotate by the drive motor 54 in both the clockwise direction and the counterclockwise direction. Due to this, by the drive motor 54 driving rotation of the drive gear 50, the inside member 21 attached to the chain 52 and, in turn, the carriage 2, can be made to move back and forth along the guide slit 103. At this time, in the present embodiment, since the inside member 21 has wheels 27 attached to it, the inside member 102 can be made to smoothly move inside of the front pillar 102 along the inner circumferential surface of the front pillar 102.

The drive motor 54 is controlled by an electronic control unit 110 in rotational speed and rotational direction. The electronic control unit 110 is comprised of a digital computer provided with components connected with each other by a bidirectional bus such as a ROM (read only memory), RAM (random access memory), CPU (microprocessor), input port, and output port. The electronic control unit 110 receives as input output signals from an outside air temperature sensor 111 and other output signals from various sensors. The electronic control unit 110 controls the various control devices including the drive motors 54 and heaters 8 based on the output signals of these sensors.

Next, referring again to FIG. 1, the operation of the wiper system 1 according to the present embodiment will be explained.

When receiving a drive request of the wiper system 1 from the driver etc., the electronic control unit 110 first judges, for example, based on the output signal from the outside air temperature sensor 111 if water is liable to have frozen inside the front pillars 102. The electronic control unit 110 starts supplying current to the heaters 8 when judging that water has frozen inside the front pillars 102 and, for example, operates the drive motors 54 to start to drive the wiper system 1 after a predetermined time has elapsed from when starting to supply current. It is preferable to be able to display to the driver the fact of the wiper system 1 being in the standby state for being driven during the period until starting to drive the wiper system 1 if in this way it is judged that water has frozen inside the front pillars 102.

On the other hand, when the electronic control unit 110 judges that water has not frozen inside the front pillars 102, it operates the drive motors 54 to start to drive the wiper system 1 without supplying current to the heaters 8.

If the wiper system 1 starts to be driven, the carriages 2 move along the guide slits 103 on the left and right front pillars 102. At this time, in the present embodiment, the electronic control unit 110 controls the rotational speeds and rotational directions of the drive motors 54 so that the carriages 2 are made to move in the same direction while maintaining substantially the same heights.

Further, if the carriages 2 move along the guide slits 103 on the front pillars 102, the wiper arms 3 move together with the carriages 2. Due to this, the wiper blades 4 move back and forth over the surface of the front window 101 up and down to wipe off deposits deposited on the surface of the front window 101 while maintaining a state substantially parallel to the two facing top and bottom sides of the front window 101.

Due to this, for example, when the shape of the surface of the front window 101 of the vehicle 100 is rectangular, if making the total length of the lengths of the wiper blades 4 added together the same as the length between the two left and right sides of the front window 101, it is possible to make the wiper blades 4 move back and forth up and down while maintaining a substantially parallel state with the two facing top and bottom sides of the front window 101 so as to have the two wiper blades 4 wipe the entire surface of the front window 101.

On the other hand, the shape of the surface of the front window 101 of the vehicle 100 is generally trapezoidal. In most cases, the top side is the shortest in length, while the bottom side is longest in length. In this way, depending on the wiped member, sometimes the distance between the two facing left and right sides differs in the vertical direction, that is, along the direction of movement of the carriages 2. In this case, to make the wiper blades 4 move back and forth up and down while maintaining a substantially parallel state with the two facing top and bottom sides of the front window 101 and have the two wiper blades 4 wipe the entire surface of the front window 101, the arrangements and lengths of the wiper blades 4 have to be made suitable ones.

Therefore, in the present embodiment, as shown in FIG. 1, the wiper blade 4 of the driver's seat side and the wiper blade 4 of the navigator's seat side are arranged at the surface of the front window 101 offset by exactly a predetermined distance in the vertical direction of the front window 101 and the total length of the wiper blades 4 obtained by adding their lengths is made at least the length of the bottom side of the front window 101 where the distance between the two facing left and right sides becomes the longest (in the present embodiment, the same length).

Due to this, at the lower side of the front window 101 where the distance between the two facing left and right sides becomes the longest, the end parts of the two wiper blades 4 at the front window 101 sides do not overlap. If the carriages 2 move from that state along the guide slits 103 to the upper side while maintaining substantially the same heights, the end parts of the two wiper blades 4 at the front window 101 sides will gradually overlap while the distance between the two wiper blades 4 in the vertical direction is maintained at a predetermined distance. For this reason, the two wiper blades 4 can wipe the entire surface of the front window 101.

According to the present embodiment explained above, the wiper system 1 for wiping off deposits deposited on a surface of a front window 101 or other wiped member is provided with a pair of carriages 2 attached to front pillars 102 or other frame members holding the wiped member so as to face each other across the wiped member and moving back and forth over the frame members along two facing sides of the wiped member, a pair of wiper arms 3 respectively attached to the pair of carriages 2 and extending from the frame member sides to the wiped member sides, and a pair of wiper blades 4 respectively attached to the pair of wiper arms 3, extending substantially parallel to the other two facing sides of the wiped member, and arranged at the surface of the wiped member.

Due to this, for example, when the surface shape of the wiped member is rectangular, if making the total length of the lengths of the wiper blades 4 added together the same as the length between two facing sides of the wiped member, it is possible to make the wiper blades 4 move back and forth while maintaining a substantially parallel state with respect to the other two facing sides of the wiped member so as to wipe the entire surface of the wiped member by the two wiper blades 4.

Further, according to the wiper system 1 according to the present embodiment, the carriages 2 are attached to the frame members so as to be able to move back and forth over the frame members along the two left and right facing sides of the wiped member. The wiped member is shaped with distances between the two facing left and right sides differing along the vertical direction of the wiped member. The pair of wiper blades 4 are arranged on the surface of the wiped member with one wiper blade 4 offset by exactly a predetermined distance from the other wiper blade 4 in the vertical direction of the wiped member. The total length of the lengths of the pair of wiper blades 4 added together is made not less than the length of the wiped member of the location where the distance between the two facing left and right sides becomes the longest.

Due to this, even if the surface shape of the wiped member is, for example, a trapezoidal shape or diamond shape or other shape where the distance between the two facing left and right sides differs along the vertical direction, it is possible to have the two wiper blades 4 wipe the entire surface of the wiped member.

Therefore, if mounting the wiper system 1 according to the present embodiment to the front window 101 of a moving vehicle 100, even during bad weather, a wide field of vision of the driver can be constantly secured and safety can be improved. Further, for the passengers as well, the forward field of vision becomes good, so the passengers can provide the driver with information on the surroundings and safety can be further improved.

Further, if mounting the wiper system 1 according to the present embodiment at the front window 101 or side window etc. of a sightseeing bus or a train or passenger boat etc. as a moving object, even during bad weather, the front field of vision becomes good, so not only can the driver secure a good field of vision, but also the passengers can enjoy the scenery, so passenger service can be improved.

Further, according to the wiper system 1 according to the present embodiment, in the case of mounting to the front window 101 of a vehicle 100 as a moving object, the pair of wiper blades 4 are arranged at the surface of the front window 101 with the wiper blade 4 of the driver's seat side of the vehicle 100 offset by exactly a predetermined distance to the lower side in the vertical direction of the front window 101 from the wiper blade 4 of the navigator's seat side of the vehicle 100.

By arranging the wiper blade 4 of the driver's seat side of the vehicle 100 at the lower side from the wiper blade 4 of the navigator's seat side of the vehicle 100 in this way, even if the carriages 2 move to the upper side and the end parts of the two wiper blades 4 at the front window 101 sides gradually overlap in the state a predetermined distance apart in the vertical direction, rain water etc. wiped off by the wiper blades 4 finally flows from the driver's seat side to the navigator's seat side in the horizontal direction. For this reason, it is possible to keep the rain water etc. wiped away by the wiper blade 4 from blocking the field of vision of the driver.

Second Embodiment

Next, referring to FIG. 7 to FIG. 14, the wiper system 1 according to a second embodiment of the present invention will be explained for the example of mounting to a front window 101 arranged at the front of a passenger compartment of a vehicle 100 as a moving object. The wiper system 1 according to the present embodiment differs from the first embodiment on the point that it is configured so that deposits on the surface of the front window 101 can be wiped away by the wiper blades 4 only when the carriages 2 move toward the lower side. Below, an explanation will be given focusing on the differences.

In the above-mentioned first embodiment, both when the carriages 2 move toward the upper side and when they move toward the lower side, the deposits on the surface of the front window 101 were wiped away by the wiper blades 4. However, to wipe away the deposits on the surface of the front window 101 by the wiper blades 4 when the carriages 2 move toward the upper side, the deposits on surface of the front window 101 have to be wiped off upward. For this reason, for example, while not that much of a problem in the case of light rain etc., in the case of heavy rain or snowfall, falling ashes, etc., rain water or snow, ash, etc. easily builds up on the rising wiper blades 4 and the field of vision of the driver is liable to be blocked. Further, since matter deposited on the surface of the front window 101 has to be wiped off upward by the wiper blades 4, the load on the drive devices 5 of the carriages 2 also easily becomes greater and therefore deterioration of the drive devices 5 and, in turn, the carriages 2, is liable to be hastened and the durability to be lowered.

Therefore, in the present embodiment, the wiper system 1 was configured so that deposits on the surface of the front window 101 can be wiped off by the wiper blades 4 only when the carriages 2 move toward the lower side. Specifically, the wiper system 1 according to the present embodiment is further provided with an arm drive mechanism 6 for making the wiper arms 3 move in a direction away from the front window 101 when the carriages 2 have moved to the lower side of the front window 101 and for making the wiper arms 3 which had been made to move in a direction away from the front window 101 move to the front window 101 side when the carriages 2 have moved to the upper side of the front window 101. Below, the arm drive mechanism 6 which the wiper system 1 according to this embodiment is provided with will be explained.

Figure 7:
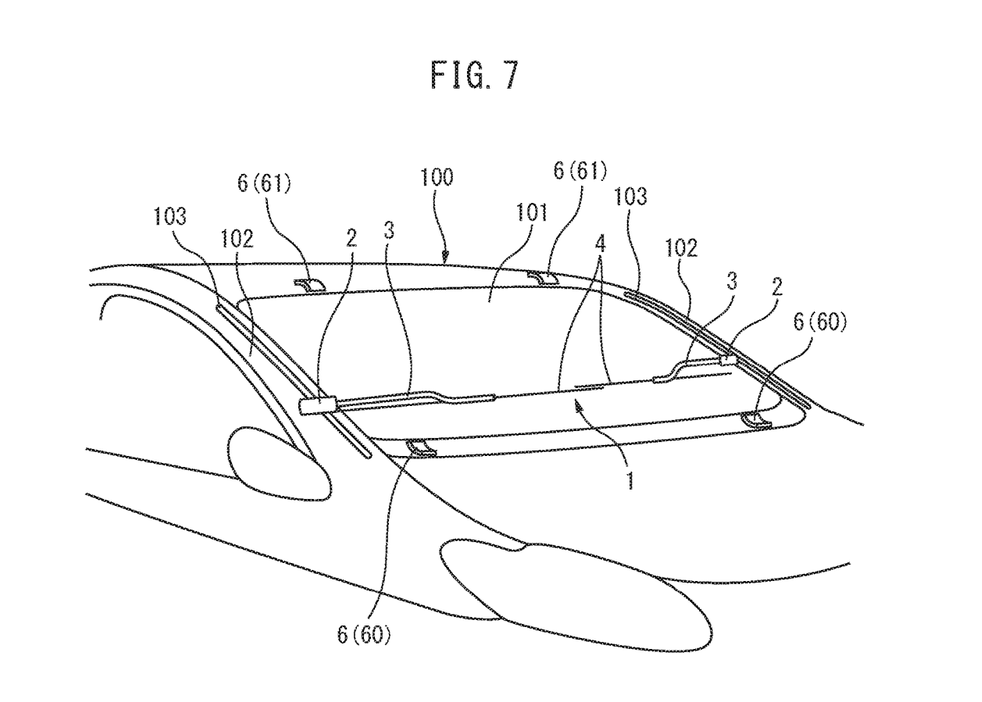
FIG. 7 is a schematic perspective view of a vehicle provided with a wiper system according to a second embodiment of the present invention.
Figure 8:
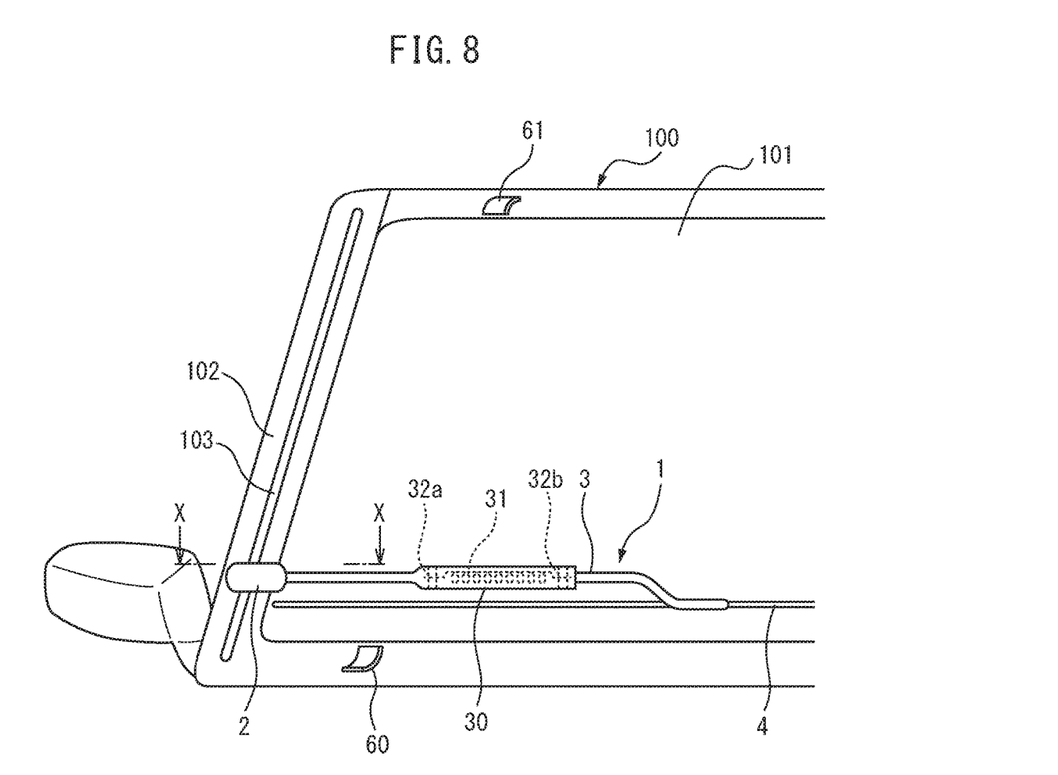
FIG. 8 is a schematic front view showing the area around a front window at a driver's seat side of the vehicle provided with the wiper system according to the second embodiment of the present invention.

FIG. 7 is a schematic perspective view of a vehicle 100 provided with the wiper system 1 according to the present embodiment. FIG. 8 is a schematic front view showing the area around the front window 101 at the driver's seat side of the vehicle 100 provided with the wiper system 1 according to the present embodiment.

Figure 9:
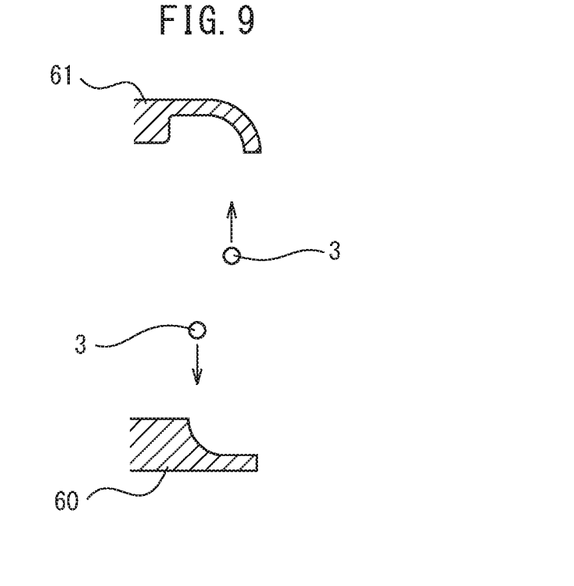
FIG. 9 is a view schematically showing a separation guide rail and a contact guide rail.

As shown in FIG. 7 and FIG. 8, the wiper system 1 according to the present embodiment is provided with carriages 2, wiper arms 3, and wiper blades 4 plus an arm drive mechanism 6 comprised of a pair of separation guide rails 60 and a pair of contact guide rails 61. The separation guide rails 60 and contact guide rails 61 are respectively explained referring to FIG. 9 schematically showing the same.

The separation guide rails 60 are attached to the frame members at the lower side of the front window 101 so as to correspond to the wiper arms 3. The separation guide rails 60, as shown in FIG. 9, have the function of mechanically guiding the wiper arms 3 in a direction away from the front window 101 so as to make the wiper blades 4 attached to the wiper arms 3 automatically separate from the surface of the front window 101 when the wiper arms 3 have moved to the lower side on the front window 101.

The contact guide rails 61 are attached to the frame members at the upper side of the front window 101 so as to correspond to the wiper arms 3. The contact guide rails 61, as shown in FIG. 9, have the function of mechanically pulling in the wiper arms 3 which had been made to separate from the front window 101 to the front window 101 side so as to make the wiper blades 4 attached to the wiper arms 3 automatically contact the surface of the front window 101 when the wiper arms 3 have moved to the upper side on the front window 101.

Further, the arm drive mechanism 6 is further provided with variable arm angle mechanisms 7 for changing the angles formed by the wiper arms 3 and the front window 101 (below, referred to as the "arm angles") so as to enable the wiper blades 4 to be made to automatically separate from and contact the front window 101 in this way at the front pillar 102 sides of the wiper arms 3 in the long direction (base end sides of wiper arms 3). Below, the variable arm angle mechanisms 7 will be explained with reference to FIG. 10 to FIG. 12.

Figure 10:
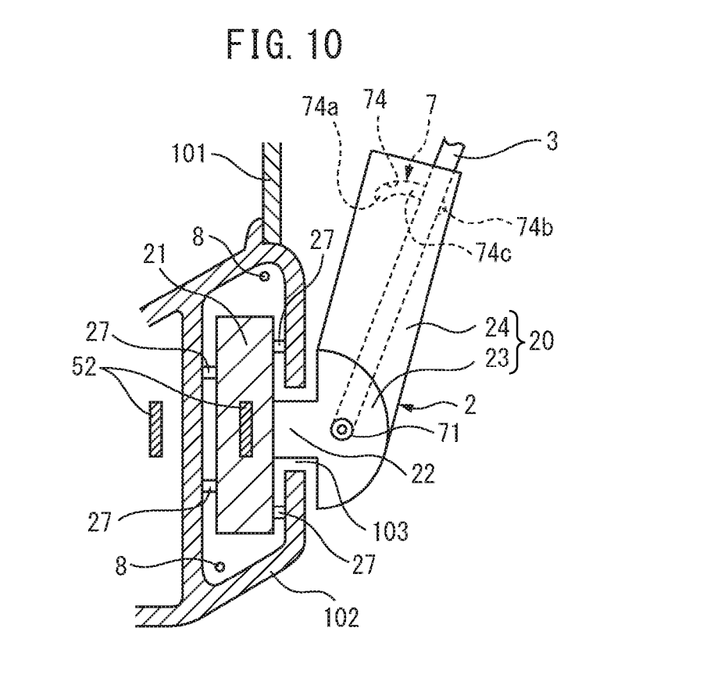
FIG. 10 is a horizontal cross-sectional view around the front pillar along the line X-X of FIG. 8.
Figure 11:
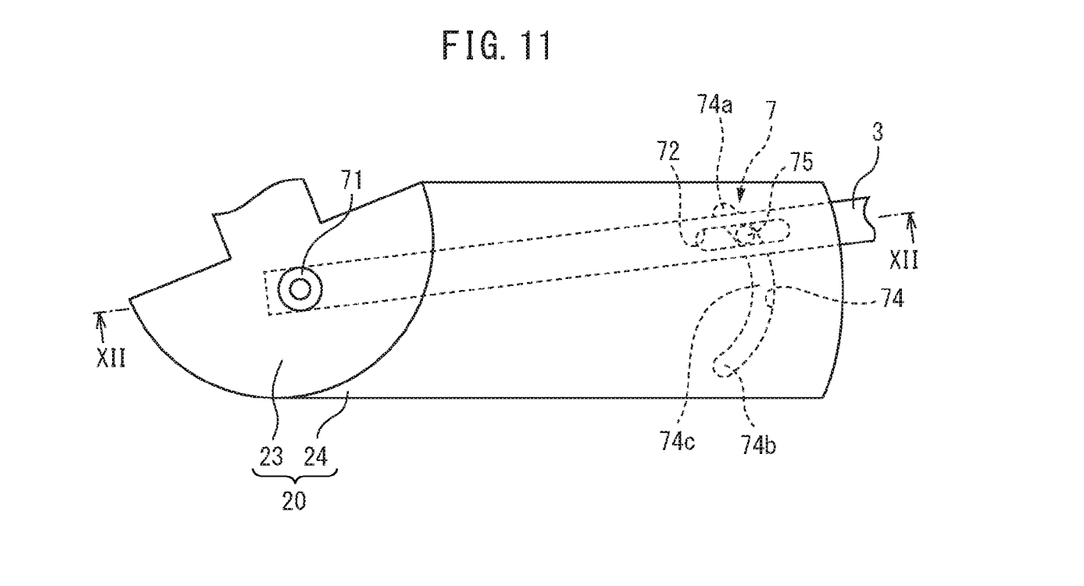
FIG. 11 is a schematic plan view of an outside member of a carriage according to the second embodiment of the present invention.
Figure 12:
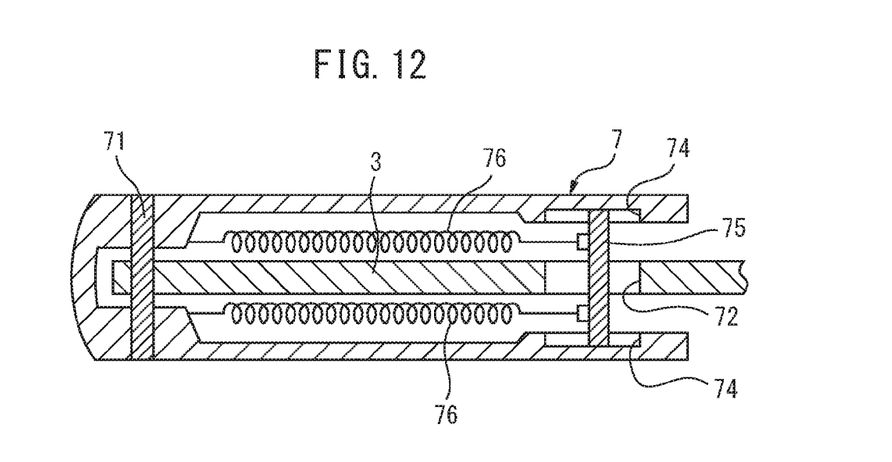
FIG. 12 is a schematic cross-sectional view of an outside member along the line XII-XII of FIG. 11.

FIG. 10 is a horizontal cross-sectional view around a front pillar 102 along the line X-X of FIG. 8. FIG. 11 is a schematic plan view of an outside member 20 of a carriage 2 according to the present embodiment. FIG. 12 is a schematic cross-sectional view of an outside member 20 along the line XII-XII of FIG. 11.

As shown in FIG. 10 to FIG. 12, a wiper arm 3 is attached by a shaft 71 to be able to rotate with respect to a semicolumnar part 23. Furthermore, a variable arm angle mechanism 7 enables rocking inside of the box-shaped part 24 in a predetermined angular range to the left and right about the shaft 71 as a center of rotation.

As shown in FIG. 12, a variable arm angle mechanism 7 is provided with an arm slit 72, guide grooves 74, a free shaft 75, and springs 76.

The arm slit 72 is a slit formed at the base end side of a wiper arm 3 and is shaped to extend in the long direction of the wiper arm 3.

The guide grooves 74 are arc-shaped grooves formed at the top and bottom of the inside surface of the box-shaped part 24 and are formed so that the center parts 74c of the arcs are positioned at the long direction front window 101 side of the wiper arm 3 compared with the two end parts 74a, 74b of the arcs.

The free shaft 75 is arranged in the arm slit 72 and the guide grooves 74. The free shaft 75 is designed to be able to move through the inside of the arm slit 72 along the insides of the guide grooves 74 in the long direction and short direction of the wiper arm 3.

Two springs 76 are provided inside the box-shaped part 24 so as to straddle the wiper arm 3. The springs 76 are fastened in the state lengthened from their free lengths with single end parts fastened to the box-shaped part 24 and the other end parts fastened to the free shaft 75 and constantly generate elastic force in the contracting direction. That is, due to the springs 76, the free shaft 75 is constantly given a force biasing it to the long direction front pillar 102 side of the wiper arm 3.

The variable arm angle mechanism 7 is configured as explained above. The free shaft 75 is designed to be able to move at the inside of the arm slit 72 along the arm slit 72 in the long direction of the wiper arm 3 and, further, simultaneously, at the insides of the guide grooves 74 along the guide grooves 74 in the short direction and long direction of the wiper arm 3. Due to this, the wiper arm 3 is designed to be able to rock about the shaft 71 as the center of rotation inside of the box-shaped part 24 within a predetermined angular range to the left and right.

At this time, at the free shaft 75, an elastic force directed to the front pillar 102 side of the wiper arm 3 in the long direction is constantly generated by the springs 76. Further, the guide grooves 74 are formed so that the center parts 74c of the arcs are positioned at the front window 101 side of the wiper arm 3 in the long direction compared with the two end parts 74a,74b of the arcs. For this reason, the free shaft 75 becomes most stable when reaching the two end parts 74a,74b of the guide grooves 74.

Figure 13:
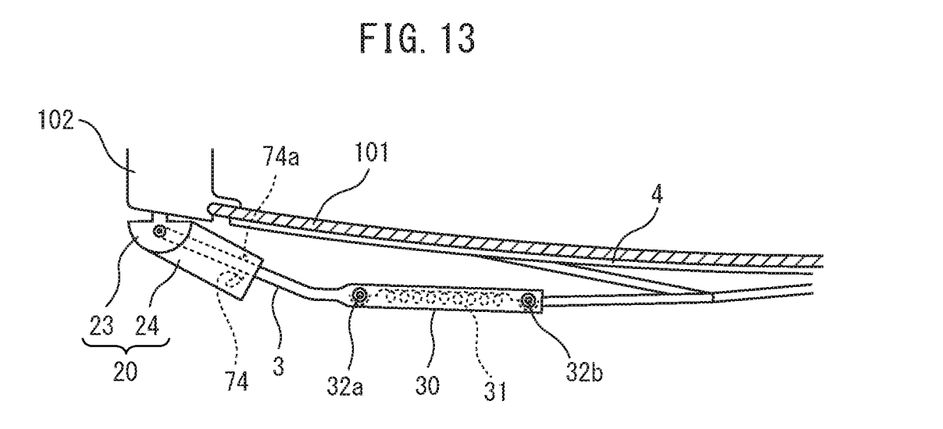
FIG. 13 is a view showing the case where a wiper arm has become a position closest to the front window side.
Figure 14:
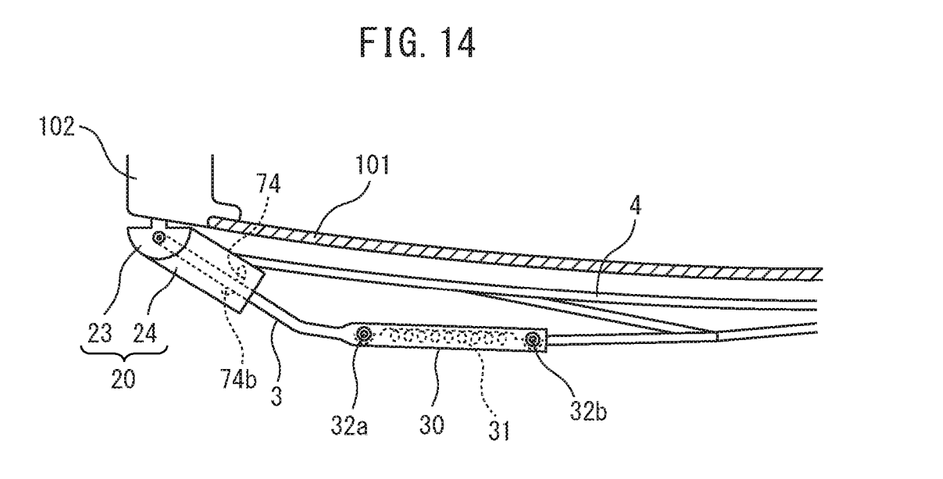
FIG. 14 is a view showing the case where a wiper arm has become a position separated the most from the front window side.

Therefore, the wiper arm 3 becomes most stable in state when, as shown in FIG. 13, the free shaft 75 has reached the end parts 74a of the guide grooves 74 at the short direction front window 101 side of the wiper arm and become a position closest to the front window 101 side and when, as shown in FIG. 14, the free shaft 75 has reached the end parts 74b at the opposite side to the short direction front window 101 side of the wiper arm 3 of the guide grooves 74 and become a position the most separated from the front window 101 side.

Next, referring again to FIG. 7, the operation of the wiper system 1 according to the present embodiment will be explained.

The wiper system 1 according to the present embodiment is designed so that the carriages 2 stop at the lower side of the front window 101 when not operated. Further, when the wiper system 1 starts to be driven, first, the carriages 2 are made to move along the guide slits 103 to the lower side just slightly, the separation guide rails 60 mechanically guide the wiper arms 3 in a direction away from the front window 101, and the wiper blades 4 attached to the wiper arms 3 are made to separate from the surface of the front window 101. At this time, the free shafts 75 of the variable arm angle mechanisms 7 of the wiper arms 3 move over the guide grooves 74 from the end parts 74b of the short direction front window 101 sides of the wiper arms 3 to the end parts 74b of the opposite sides.

After that, in the state where the wiper blades 4 are made to separate from the surface of the front window 101, the carriages 2 are made to move along the guide slits 103 to the upper side, then the contact guide rails 61 are used to mechanically pull in the wiper arms 3 which had been made to separate from the front window 101 to the front window 101 side to make the wiper blades 5 attached to the wiper arms 3 contact the surface of the front window 101. At this time, the free shafts 75 of the variable arm angle mechanisms 7 of the wiper arms 3 move over the guide grooves 74 from the end parts 74b at the opposite sides to the short direction front window 101 sides of the wiper arms 3 to the end parts 74a of the front window 101 side.

After that, in the state where the wiper blades 4 are made to contact the surface of the front window 101, the carriages 2 are made to move along the guide slits 103 to the lower side whereby the wiper blades 4 wipe off deposits deposited on the surface of the front window 101.

In this way, in the wiper system 1 according to the present embodiment, when the wiper blades 4 are rising, the wiper blades 4 separate from the front window 101, while when the wiper blades 4 descend, the wiper blades 4 contact the surface of the front window 101 and wipe off the deposits on the surface. By limiting the function of the wiper system in this way to when the wiper blades 4 descend, it is possible to keep rain water or snow from building up on the wiper blades 4 and thereby maintain a good field of vision for the driver. Further, the load on the drive devices 5 of the carriages 2 can also be suppressed, so the drop in durability of the carriages 2 can be suppressed.

Further, in the present embodiment, the wiper blades 4 are separated from the front window 101 when the wiper blades 4 are rising, so the deposits on the surface of the front window 101 do not have to be wiped off upward by the wiper blades 4. For this reason, it is possible to make the speed of movement of the carriages 2 faster by the amount of reduction of the load when the wiper blades 4 are made to rise, that is, when making the carriages 2 move to the upper sides. Due to this, the wiping efficiency of the wiper system 1 can be raised and trouble to the driver due to the operation of the wipers can be reduced.

Note that in the present embodiment, the wiper blades 4 are separated from the front window 101 when the wiper blades 4 rise, so it is not necessarily required to make the carriages 2 simultaneously move in the same direction. When one wiper blade 4 is descending, the other wiper blade 4 may also be made to rise, while when one wiper blade 4 is rising, the other wiper blade 4 may be made to descend.

The wiper system 1 according to the present embodiment explained above is further provided with an arm drive mechanism 6 for making the pair of wiper arms 3 move in a direction away from the wiped member when the carriages 2 move to the lower side of the front window 101 or other wiped member and for making the pair of wiper arms 3 separated from the wiped member move to the wiped member side when the carriages 2 move to the upper side of the wiped member.

For this reason, it is possible to keep rain water or snow from building up on the wiper blades 4 and thereby possible to secure a good field of vision at the front of the front window 101 or other wiped member. Further, it is also possible to suppress the drive loads on the drive devices 5 of the carriages 2, so it is possible to suppress any drop in the durability of the carriages 2.

Above, embodiments of the present invention were explained, but the above embodiments only show some of the examples of application of the present invention. The technical scope of the present invention is not limited to the specific configurations of the above embodiments.

In the above embodiments, the carriages 2 were made to move back and forth up and down along the two facing left and right sides of the front window 101 or other wiped member, but the wiper system 1 may also be configured so as to make them move back and forth left and right along the two facing top and bottom sides of the wiped member.

Further, in the above embodiments, the drive devices 5 of the carriages 2 were made mechanical ones, but the invention is not limited to this. The drive devices 5 may for example also be made electromagnetic ones of linear motors. In this case, it is also possible to arrange electromagnets at the insides of the front pillars 102 and make the poles of the electromagnets reverse so as to give force to the inside members 21 of the carriages 2 to make the carriages 2 rise and descend.

Further, in the above embodiments, when starting to drive the carriages 2, it is also possible to emit an alarm sound to draw the attention of the surroundings. Further, it is also possible to design the system so that the electronic control unit 110 detects the loads of the drive devices 5 and make the drive devices 5 temporarily stop when certain loads or more are applied.

Figure 15:
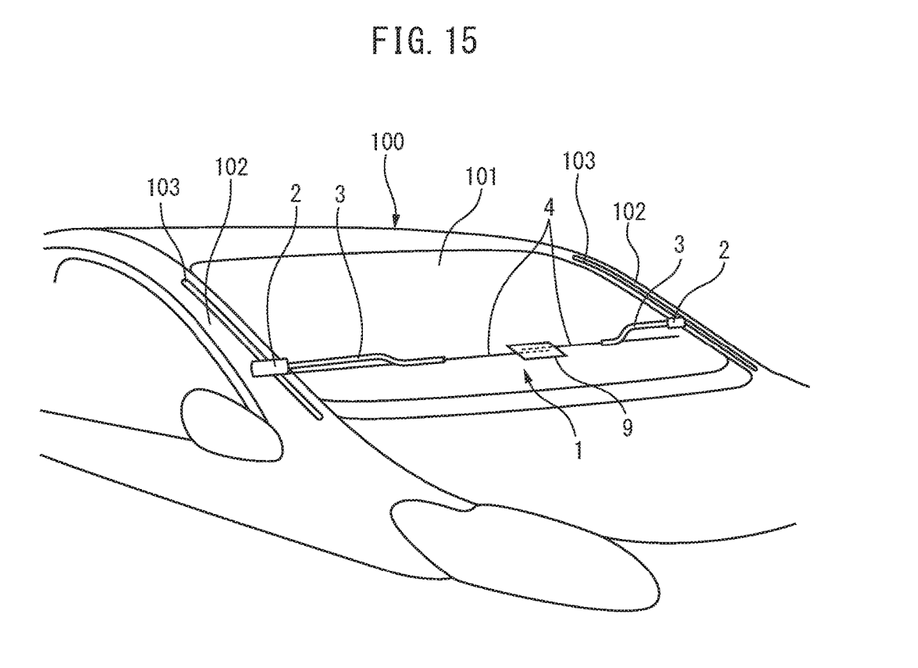
FIG. 15 is a view showing a modification of the wiper system according to the first embodiment of the present invention.

Further, for example, in the above first embodiment, as shown in FIG. 15, it is also possible to provide a storage device 9 for storing the wiper blade 4 of the driver's seat side and the wiper blade 4 of the navigator's seat side and make the two wiper blades 4 move up and down together.

Further, in the above second embodiment, the variable arm angle mechanism 7 was made mechanical, but the invention is not limited to these. It may also be made electromagnetic. In this case, for example, the free shaft 75 is made to include a permanent magnet or other magnetic sensing substance to provide the two end parts 74a,74b of the guide grooves 74 with electromagnets. Further, it is sufficient to change the angle of the wiper arm 3 by supplying current to the electromagnets of the two end parts 74a,74b of the guide grooves 74. Further, if the vehicle advancing speed becomes faster, the rain drops etc. deposited on the front window 101 will flow from the lower side of the front window 101 toward the upper side, so if making the variable arm angle mechanism 7 electromagnetic, when the vehicle advancing speed becomes a certain speed or more, at the time of rise of the wiper blade 4, the wiper blade 4 can be made to contact the front window 101, while at the time of descent of the wiper blade 4, the wiper blade 4 can be made to separate from the front window 101. Due to this, the load when the wiper blade 4 is used to wipe off deposits can be further decreased.

Further, the drawings are schematic. The ratios of the dimensions of the parts etc. differ from the actual ones. Therefore, the specific dimensions of the different parts should be determined with reference to the above-mentioned explanation. Further, among the drawings as well, parts differing in relation or ratio of dimensions etc. are also included needless to say.

REFERENCE SIGNS LIST 1. wiper system
2. carriage
3. wiper arm
4. wiper blade
6. arm drive mechanism
60. separation guide rail
61. contact guide rail
7. variable arm angle mechanism
100. vehicle
101. front window (wiped member)
102. frame member (front pillar)

The invention claimed is:

1. A wiper system for wiping off deposits deposited on a surface of a wiped member,
the wiper system comprising:
a pair of carriages attached to frame members holding the wiped member so as to face each other across the wiped member and moving back and forth over the frame members along two left and right facing sides of the wiped member;
a pair of wiper arms respectively attached to the pair of carriages and extending from the frame member sides to the wiped member sides;
a pair of wiper blades respectively attached to the pair of wiper arms, extending substantially parallel to the other two facing sides of the wiped member, and arranged at the surface of the wiped member; and
an arm drive mechanism making the pair of wiper arms move in a direction away from the wiped member when the carriages move down to the lower side of the wiped member and making the pair of wiper arms which were made to move away from the wiped member move to the wiped member side when the carriages move up to the upper side of the wiped member,
wherein the arm drive mechanism comprises:
separation guide rails provided at the frame members at a lower side from the wiped member and mechanically guiding the pair of wiper arms in a direction away from the wiped member when the carriages have moved to the lower side of the wiped member,
contact guide rails provided at the frame members at an upper side from the wiped member and mechanically pulling the pair of wiper arms which were made to move in a direction away from the wiped member to the wiped member side when the carriages have moved to the upper side of the wiped member, and
variable arm angle mechanisms provided at the carriages for making the wiper arms rock about fastening shafts, provided for attaching end parts of the wiper arms at long direction frame member sides to the carriages, as centers of rotation within a predetermined angular range.

2. The wiper system according to claim 1, wherein
the wiped member is shaped so that distances between the two facing left and right sides differ along a vertical direction of the wiped member,
the pair of wiper blades are arranged at the surface of the wiped member with one wiper blade offset from the other wiper blade in the vertical direction of the wiped member by exactly a predetermined distance, and
a total length of respective lengths of the pair of wiper blades added together is made a length of the wiped member or more at a location where the distance between the two facing left and right sides becomes longest.

3. The wiper system according to claim 1, wherein
the wiped member is a front window of a vehicle,
the frame members are front pillars of the vehicle, and
a wiper blade at a driver's seat side of the vehicle among the pair of wiper blades is arranged at a surface of the front window offset by exactly a predetermined distance to a lower side in a vertical direction of the front window from a wiper blade of a navigator's seat side of the vehicle.

4. A wiper system for wiping off deposits deposited on a surface of a wiped member,
the wiper system comprising:
a pair of carriages attached to frame members holding the wiped member so as to face each other across the wiped member and moving back and forth over the frame members along two left and right facing sides of the wiped member;
a pair of wiper arms respectively attached to the pair of carriages and extending from the frame member sides to the wiped member sides;
a pair of wiper blades respectively attached to the pair of wiper arms, extending substantially parallel to the other two facing sides of the wiped member, and arranged at the surface of the wiped member; and
an arm drive mechanism making the pair of wiper arms move in a direction away from the wiped member when the carriages move down to the lower side of the wiped member and making the pair of wiper arms which were made to move away from the wiped member move to the wiped member side when the carriages move up to the upper side of the wiped member, wherein the arm drive mechanism is configured to be able to switch between
- a state making the pair of wiper arms move in a direction away from the wiped member when the carriages have moved to the lower side of the wiped member and making the pair of wiper arms which had been made to separate from the wiped member move to the wiped member side when the carriages have moved to the upper side of the wiped member, and
- a state making the pair of wiper arms move in a direction away from the wiped member when the carriages have moved to the upper side of the wiped member and making the pair of wiper arms which had been made to separate from the wiped member move to the wiped member side when the carriages have moved to the lower side of the wiped member.

5. The wiper system according to claim 4, wherein
the arm drive mechanism is provided with variable arm angle mechanisms provided at the carriages for making the wiper arms rock about fastening shafts, provided for attaching end parts of the wiper arms at long direction frame member sides to the carriages, as centers of rotation by electromagnetic force within a predetermined angular range.

* * * * *